US009891953B2

(12) United States Patent
Beveridge et al.

(10) Patent No.: US 9,891,953 B2
(45) Date of Patent: *Feb. 13, 2018

(54) DYNAMIC RESOURCE CONFIGURATION BASED ON CONTEXT

(71) Applicant: VMware, Inc., Palo Alto, CA (US)

(72) Inventors: Daniel James Beveridge, Apollo Beach, FL (US); Banit Agrawal, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,247

(22) Filed: Nov. 14, 2016

(65) Prior Publication Data

US 2017/0083371 A1 Mar. 23, 2017

Related U.S. Application Data

(63) Continuation of application No. 14/820,398, filed on Aug. 6, 2015, now Pat. No. 9,513,950, which is a continuation-in-part of application No. 14/679,007, filed on Apr. 5, 2015, which is a continuation of application No. 13/558,211, filed on Jul. 25, 2012, now Pat. No. 9,003,037.

(51) Int. Cl.
| | | |
|---|---|---|
| G06F 3/00 | (2006.01) | |
| G06F 9/50 | (2006.01) | |
| G06F 9/455 | (2018.01) | |
| H04L 29/08 | (2006.01) | |
| H04L 12/26 | (2006.01) | |
| H04L 12/911 | (2013.01) | |
| G06F 9/54 | (2006.01) | |

(52) U.S. Cl.
CPC ........ *G06F 9/5011* (2013.01); *G06F 9/45558* (2013.01); *G06F 9/5005* (2013.01); *G06F 9/54* (2013.01); *G06F 9/542* (2013.01); *H04L 43/08* (2013.01); *H04L 47/783* (2013.01); *H04L 67/22* (2013.01); *G06F 2009/4557* (2013.01); *G06F 2009/45591* (2013.01)

(58) Field of Classification Search
CPC ....................................................... G06F 9/54
USPC ....................................................... 719/310
See application file for complete search history.

(56) References Cited

U.S. PATENT DOCUMENTS

| | | |
|---|---|---|
| 6,760,903 B1 | 7/2004 | Morshed |
| 7,577,959 B2 | 8/2009 | Nguyen et al. |
| 8,260,840 B1 | 9/2012 | Sirota et al. |
| 8,271,644 B2 | 9/2012 | Radhakrishnan et al. |

(Continued)

OTHER PUBLICATIONS

Quyet Thang, Virtual Machine Allocation in cloud Computing for Minimizing Total Execution Time on Each Machine, 2013.*

(Continued)

*Primary Examiner* — Lechi Truong

(57) ABSTRACT

Aspects of the disclosure allocate shares of processing resources or other physical resources among virtual machines (VMs) operating as, for example, virtual desktops on a plurality of host computing devices. Allocations of resources are adjusted based on the user activity, VM activity, and/or application activity detected by an agent executing on each VM. Allocated shares may be boosted, unboosted, or normalized, depending on the type and duration of detected activity, by a resource allocation manager executing on a management server.

20 Claims, 16 Drawing Sheets

(56) References Cited

U.S. PATENT DOCUMENTS

| | | |
|---|---|---|
| 8,321,558 B1 | 11/2012 | Sirota et al. |
| 8,429,276 B1 | 4/2013 | Kumar |
| 8,560,671 B1 | 10/2013 | Yahalom et al. |
| 8,738,972 B1* | 5/2014 | Bakman ............. G06F 11/0712 714/47.1 |
| 8,789,041 B2 | 7/2014 | Verna |
| 9,003,037 B2 | 4/2015 | Beveridge |
| 2002/0083110 A1 | 6/2002 | Kozuch |
| 2005/0262504 A1 | 11/2005 | Esfahany et al. |
| 2006/0184935 A1 | 8/2006 | Abels |
| 2006/0200821 A1 | 9/2006 | Cherkasova |
| 2007/0171921 A1 | 7/2007 | Wookey |
| 2007/0300221 A1 | 12/2007 | Hartz |
| 2008/0229031 A1 | 9/2008 | Villarreal |
| 2009/0007106 A1* | 1/2009 | Araujo, Jr. ............... G06F 9/54 718/1 |
| 2010/0044519 A1 | 2/2010 | Fol et al. |
| 2010/0211958 A1* | 8/2010 | Madison, Jr. ....... G06F 11/3433 718/105 |
| 2010/0223368 A1 | 9/2010 | Runcie |
| 2010/0306163 A1 | 12/2010 | Beaty |
| 2010/0325261 A1 | 12/2010 | Radhakrishnan et al. |
| 2010/0325278 A1 | 12/2010 | Heim |
| 2011/0125895 A1 | 5/2011 | Anderson et al. |
| 2011/0126197 A1 | 5/2011 | Larsen et al. |
| 2011/0154320 A1 | 6/2011 | Verma |
| 2011/0209156 A1 | 8/2011 | Box |
| 2011/0251992 A1 | 10/2011 | Bethlehem |
| 2012/0054409 A1 | 3/2012 | Block et al. |
| 2012/0089666 A1 | 4/2012 | Goswami |
| 2012/0166624 A1 | 6/2012 | Suit |
| 2012/0222004 A1* | 8/2012 | Labat ....................... G06F 9/50 717/120 |
| 2013/0014101 A1* | 1/2013 | Ballani ................. H04L 67/101 718/1 |
| 2013/0080619 A1 | 3/2013 | Assuncao et al. |
| 2013/0086235 A1 | 4/2013 | Ferris |
| 2013/0346618 A1 | 12/2013 | Holkkola |
| 2014/0052864 A1 | 2/2014 | Van Der Linden et al. |
| 2014/0059229 A1 | 2/2014 | Parikh |
| 2014/0250436 A1 | 9/2014 | Tang |
| 2014/0282529 A1 | 9/2014 | Begenhagen |
| 2013/0311662 A1 | 11/2014 | Stolyar |
| 2014/0372553 A1 | 12/2014 | Blackburn |
| 2015/0212857 A1 | 7/2015 | Beveridge |
| 2016/0041839 A1 | 2/2016 | Wright |

OTHER PUBLICATIONS

Nguyen, Thu Ha T, "United States Patent and Trademark Office Action," U.S. Appl. No. 13/558,211, dated Mar. 17, 2014, 16 pages.

Nguyen, Thu Ha T, "United States Patent and Trademark Office Action," U.S. Appl. No. 13/558,211, dated Aug. 14, 2014, 16 pages.

Ongaro, Diego, "Scheduling I/O in Virtual Machine Monitors", Mar. 5-7, 2008, 10 pages.

Labud, J., "Office Action", U.S. Appl. No. 14/679,007, dated Apr. 11, 2016, 16 pages.

Labud, J., "Office Action", U.S. Appl. No. 14/679,007, dated Oct. 6, 2016, 21 pages.

Truong, L., "Notice of Allowance", U.S. Appl. No. 14/820,398, dated Aug. 17, 2016.

* cited by examiner

DYNAMIC RESOURCE CONFIGURATION BASED ON CONTEXT

CROSS-REFERENCE TO RELATED APPLICATION

This application is a continuation of U.S. patent application Ser. No. 14/820,398, filed on Aug. 6, 2015, entitled "Dynamic Resource Configuration Based on Context", now U.S. Pat. No. 9,513,950 issued on Dec. 6, 2016, which is a continuation-in-part of U.S. patent application Ser. No. 14/679,007, filed on Apr. 5, 2015, entitled "Dynamic Allocation of Physical Computing Resources Amongst Virtual Machines", which is a continuation of U.S. Pat. No. 9,003,037, issued on Apr. 7, 2015, entitled "Dynamic Allocation of Physical Computing Resources Amongst Virtual Machines," both of which are incorporated by reference herein in their entireties.

BACKGROUND

Some existing systems treat all virtual machines (VMs) as black boxes, whose internal activities are assumed to be legitimate and needing the best service possible. Under some existing approaches, a VM has the same amount of processing resources or the same storage priority independent of what applications the VM is executing, whether or not the user is active or idle. In some existing systems, shares of resources initially allocated to VMs are not adjusted.

However, for many VMs, and especially for virtual desktop interfaces (VDIs), prioritizing the value of operations executed by the VM allows a system to make better scheduling and resource allocation decisions. Even in systems where service level agreements (SLAs), terms of service (TOS), quality of service (QoS), or other policies allocate different levels of resources between VMs, those systems usually do not evaluate whether an individual VM is optimizing use of the resources allocated to that VM. For example, some applications are prioritized by users over other applications, but under some existing systems no change is made to the allocated resources based upon whether or not a VM is executing a priority application. Likewise, in some examples, resources may be allocated to VMs which are idle, because the idle or active status of the VM is not considered by the scheduling system.

BRIEF DESCRIPTION OF THE DRAWINGS

Corresponding reference characters indicate corresponding parts throughout the drawings.

DETAILED DESCRIPTION

Figure 1:
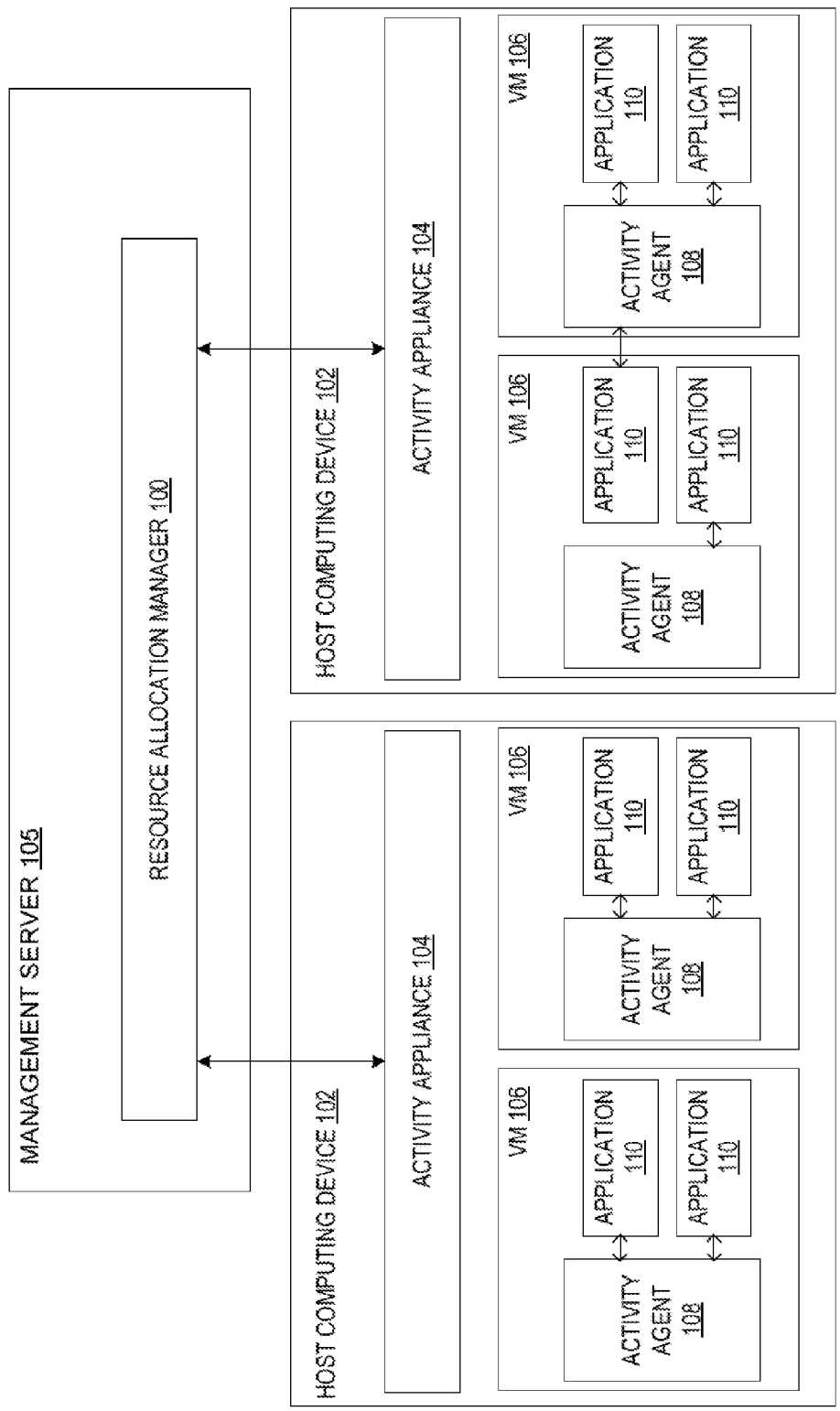
FIG. 1 is a block diagram of an example architecture for implementing value based resource scheduling.

Examples described herein disclose a method for improving user experience and business value by modifying an allocation of resources to virtual machines (VMs) based upon factors such as user activity, machine activity, and application activity. In some examples, the operations of some VMs are prioritized over others and given more resources, while operations with a lower priority are dynamically given reduced resources. As applications, user, and machine activity change, the allocation of resources to the VM running the application are boosted or increased, unboosted or decreased, or normalized dynamically by returning to an initial allocated amount. In this manner, aspects of the disclosure map user context onto a resource consumption profile, in a way that improves or maintains a user experience inside boundaries defined by a business or other entity.

In some examples, resources are allocated by assigning shares to VMs. A share of resources is, in some examples, measured in processing clock cycles, as a portion of processing time, etc. Initially, in some examples, shares are allocated evenly amongst VMs. In one example, each VM is allocated 1,000 shares. In some examples, boosting resources involves increasing the shares allotted to a VM by a factor of ten, while unboosting resources involves decreasing the shares allotted to the VM by ten. In that example, a boosted share allocation is 10,000 shares, while an unboosted share allocation is 100 shares.

Some virtual desktop interface (VDI) users are sensitive to delays in user experience and notice fluctuations in performance. However, not every operation users execute is perceived as equally important by the user. Users tend to weigh events they initiate and must wait upon for completion more highly than events they initiate but which are completed in the background. Further, not all applications are equally important to either the user or a business. For example, a critical call center application may outrank casual browsing or email work. Certain applications are deemed more important because of their business value, because of their impact on user perceptions, or for some other reason. In some examples, policies are created to identify priority applications, or those which are more important to a user, under a service level agreement (SLA), quality of service (QoS) agreement, terms of service (TOS), etc. The prioritized applications, in some examples referred to as 'whitelist' applications, are given priority over other applications. The policies, including what applications are on the whitelist, what applications, users or machines have storage priority, graphics protocols for specific activity, etc. are, in some examples, established by an administrator, the user, the SLA, QoS agreement, TOS, etc.

Additionally, VMs with no user activity or which are disconnected consume fewer or no resources. Consequently, the resources allocated to an idle VM, idle user, or idle application are reduced with little to no adverse impact on the user experience at the idle VM, user, or application. However, as resources are reduced to one VM, more resources become available for another VM, user, or application with a higher priority. Consequently, the higher priority VM, user, or application has a better user experience, faster processing time, etc.

In some examples, the disclosed method sends suggested changes to VM resources to the platform in real-time based on whether users are performing a whitelist activity, or if their virtual desktop has been idle for some time or perhaps been disconnected. By triggering based on such key events, the platform is better informed in real time which VMs best deserve priority. During regular load levels and particularly during higher than expected host load levels, this rationalized prioritization benefits VMs doing the most time-critical activities.

In some configurations, the disclosed architecture includes an in-guest agent (e.g., executing in a guest operating system, of a VM) which triggers based on which applications are running, the focus or activity of a user, or how long a user has been idle. The agent located on individual VMs observes how long since a keyboard or mouse action by the user has been observed and triggers an 'idle state' flag or marker accordingly. The agent communicates with an appliance or coordinator on the host computing device which receives input from multiple agents on the same hypervisor host and takes action accordingly by sending requests to a hypervisor management platform for resource shares adjustments to the various VMs per defined policies. In general, the agent has visibility to user activity (e.g., which applications processes are running, which applications are in focus or in the foreground, state, etc.). Such user activity, or the activity of the machine or application, is in some examples the user session, the monitored state, activity information, etc.

Whitelist and blacklist events are triggered by the agent and executed by a coordinator. If an excessive number of events arrive at the coordinator in close proximity, resource modifications may be triaged to reduce the number of resource adjustments to a defined maximum rate.

Aspects of the disclosure further enable improved user experience during whitelisted operations or "active" periods. Users who are executing operations which are identified as whitelisted, or users who are active receive more resources, improving the user experience, increasing productivity of high priority tasks, and improving overall efficiency. More speed and memory resources are made available to machines, applications, or users which are performing whitelisted activities, or are active over those which are inactive or performing blacklisted activity.

Aspects of the disclosure further promote more efficient allocation of resources between users, machines, and applications. Allocation decisions are centralized, and the needs of individual VMs or users are routed through individual contacts, such as activity appliances, to streamline allocation decision-making. This reduces strain on processing resources, as well as reducing bandwidth allocation for communication between host computing devices and the management server.

FIG. 1 is a block diagram of exemplary architecture for implementing value based resource scheduling. FIG. 1 depicts a resource allocation manager 100 that is executing on a management server 105. The resource allocation manager 100 allocates physical computing resources of one or more physical host computing devices 102 to VMs 106 operating on the host computing devices 102 based on the activities of the VMs 106, users 1508, and applications 110. The resource allocation manager 100 federates policies, deploys the virtual appliances, ensures reliable execution of changes to share allocations among VMs 106.

Each host computing device 102 includes a hardware platform 1605, hypervisor 1610, and multiple VMs 106. Although only two VMs 106 are shown on each host computing device 102, any number of VMs 106 may reside on each of the any number of host computing devices 102. The resource allocation manager 100 allocates physical resources amongst the VMs 106. The physical resources allocated include elements of the hardware platform 1605, illustrated in more detail in FIGS. 15 and 16, including a processor 1502, a memory 1504, a network communication interface 1512, a user interface device 1510, and a storage interface 1516 connected to a data storage device (not illustrated).

In the illustrated example, each of the VMs 106 executes an activity agent 108 and one or more applications 110. The management server 105 and the host computing devices 102 are all communicatively coupled to one another via a network (not illustrated).

Each activity agent 108 is configured to gather information about activities occurring on its associated VM 106. In some examples, an activity agent 108 tracks what applications 110 are executing on the VM 106, whether a given application 110 is active or idle, whether the VM 106 is active or idle, and/or whether the user is active or idle.

Figure 15:
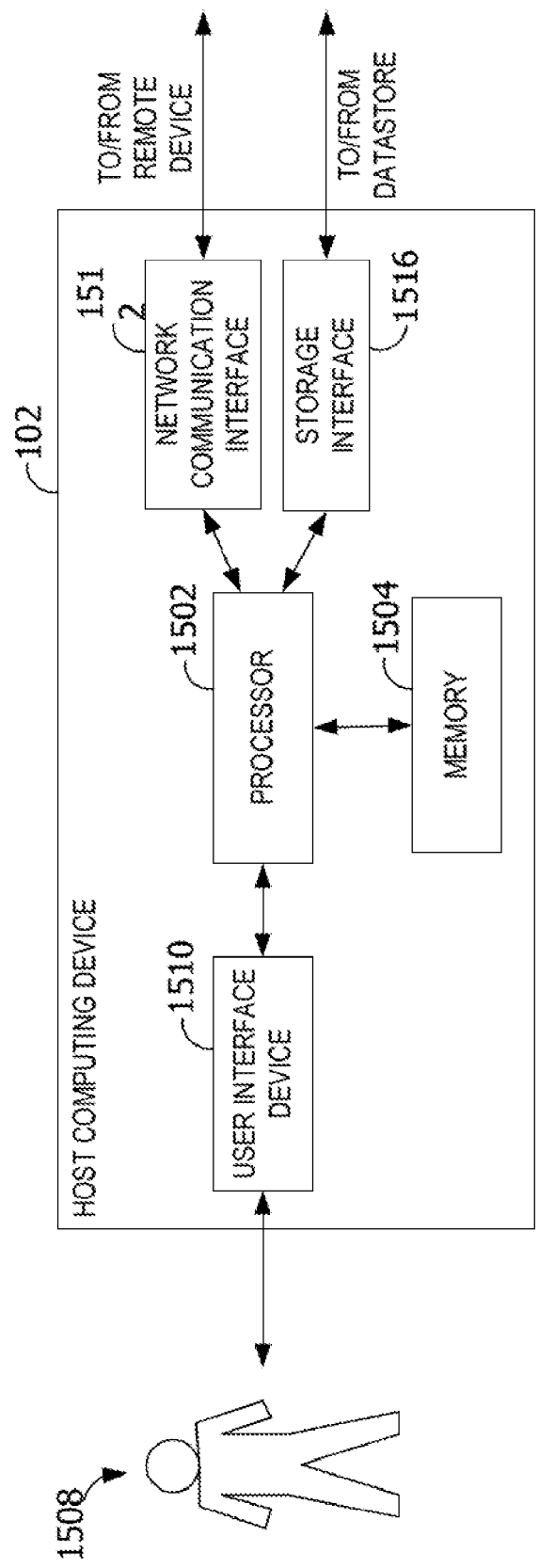
FIG. 15 is a block diagram of an example host computing device upon which VMs are instantiated.

In some examples, whether a user is idle is established by user interface device 1510 input (see FIG. 15). Specifically, the activity agent 108 in some examples tracks input from user interface devices 1510 such as mouse activity, keyboard activity, audio or video recordings, etc. Other examples of monitoring activity include events and actions performed by a user accessing the application 110. Such events or actions may include user interface dialog boxes opening/closing, user interface control selection (e.g., button presses, mouse clicks, menu selections), and the like. The activity agent 108 tracks the events and/or actions by intercepting system calls and/or event delivery, such as by accessing or hooking into system and/or platform application programming interfaces (APIs) (e.g., Win32, Java, .NET, Linux system calls). The information tracked, in some examples, by the activity agent 108 reflects the state of the machine, user, or application. In some examples, this is referred to as the monitored state.

Examples of APIs and operations for determining user idle time are shown in Table 1 below, although other examples are contemplated.

TABLE 1

Example APIs and Operations for Determining User Idle Time.

| API or Operation | Description |
| --- | --- |
| DllCall("user32.dll", "int", "GetLastInputInfo", "ptr", DllStructGetPtr($LastInputInfo)) | Determine the last time input was entered |
| $upTime = DllCall("kernel32.dll", "long", "GetTickCount") | Determine the time since the system booted |
| $idleTime = $upTime[0] − DllStructGetData($LastInputInfo, 2) | Retrieve the idle time |

The activity agent 108 forwards information about the tracked events and/or actions to an activity appliance 104. Each appliance is a process running on a machine or virtual server. In some examples, each host computing device 102 executes its own activity appliance 104. In other examples, activity appliances 104 are omitted, and activity agents 108 communicate directly with the resource allocation manager 100. In systems without activity appliances 104, the system is typically smaller, with only a few host computing devices 102. Adding or eliminating the activity appliance 104 is adjustable, based on the size and scalability of the system.

In most examples, the VM 106 and the activity agent 108 are located on the same host computing device 102 as the activity appliance 104. However, in other examples, such as when a VM 106 is migrated from one host computing device 102 to another, the activity agent 108 continues to forward its tracked information to the original activity appliance 104 associated with the original host computing device 102 until the activity agent 108 and activity appliance 104 are updated. In some examples, VMs 106 are re-tethered to the local host computing device 102 on a schedule (e.g., every hour). In another example, the activity agent 108 is updated for any patches or fixes, or it is updated to re-tether itself. In one example of re-tethering, the activity agent 108 becomes aware that it is located on a new host 102 (e.g., a different hypervisor 1610) and as a result, the activity agent 108 tethers itself to the new activity appliance 104 that is co-located with it on the new host 102. For example, the activity agent 108 will periodically query to an agent (e.g., VMTools, by VMware, Inc.) inside the VM 106 to determine what host 102 the VM 106 is running on. When the host 102 changes, the activity agent 108 will pick up the change at its next query to the agent on the VM 106, and as a result of the changed host 102, the activity agent 108 will initiate community to the activity appliance 104 that is co-located on same host 102.

Some examples contemplate one appliance per hypervisor host, and the agents communicate with the appliance, bypassing any other virtual management platform (e.g., the agents make calls directly to the host, such as an ESX host from VMware, Inc.), to keep the transactional overhead low.

Monitored or triggering activities may also or instead include VM state information, such as may be related to virtual desktop sessions provided or hosted by each of the VMs 106. VM state information (and generally other types of activity information) may also be tracked by the activity agent 108 or some other module. For example, in some examples, the hypervisor 1610 may itself include a module for tracking and providing indications of networking activity performed by each of the VMs 106.

The resource allocation manager 100 receives and records information about activities that may occur or that are occurring on the VMs 106 from the activity appliances 104. As another example, the management server 105 (or some other computing system) may include a virtual desktop management module that is configured to facilitate access by client devices to virtual desktops hosted by the VMs 106. The virtual desktop management module may monitor the connection status between a client device and a corresponding VM 106, so as to determine state information such as whether a user 1508 is logged in, whether a user 1508 is active or inactive, whether a user 1508 is connected, etc.

Note that while the resource allocation manager 100 is shown executing on the management server 105 in FIG. 1, the resource allocation manager 100 may be executed elsewhere in other examples. For example, the resource allocation manager 100 may execute on one of the VMs 106. As another example, some or all of the functions of the resource allocation manager 100 may be performed within the hypervisor 1610. In some examples, the resource allocation manager 100 is not a centralized manager as shown, and resource allocation decisions are instead made locally (e.g., within the hypervisor 1610 of each of the computers 130), such as based on information received from other localized managers using a peer-to-peer distribution model.

The management server 105 may be part of a commercially available VM management system, such as VirtualCenter by VMware Inc., Virtual Machine Manager by Microsoft Corp., XenCenter by Citrix Inc., or the like. Virtual desktop management facilities, when employed, may be provided by commercial available systems, including VMware's Virtual Desktop Management Server. At least some of the functions of the activity agent 108 110 may be provided by commercially available systems, including end user monitoring and performance management tools or systems provided by Knoa Software Inc. The hypervisor 1610 may be or include a hypervisor such as ESXi by VMware, Xen by Citrix, Hyper-V by Microsoft Corporation, or the like.

Figure 2:
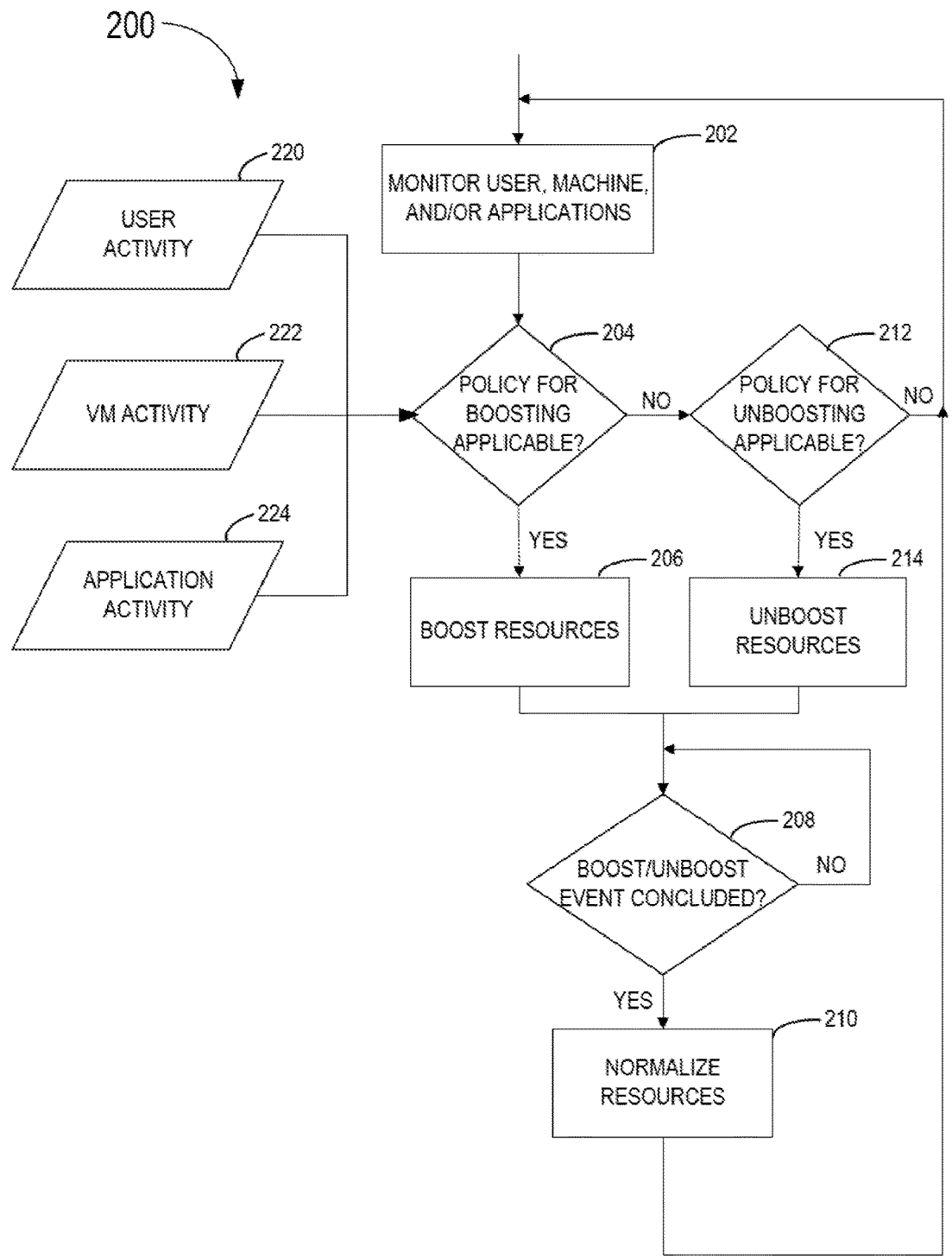
FIG. 2 is a flowchart of an example method of value based resource scheduling performed by an activity agent, an activity appliance, and a resource allocation manager operating on a management server.

FIG. 2 is a flowchart of an exemplary method of value based resource scheduling performed by an activity agent, an activity appliance, and a resource allocation manager operating on a management server. At 202, the activity agent 108 monitors the user activity 220, VM activity 222, and application activity 224. At 204, the activity agent evaluates whether the user activity 220, VM activity 222, or application activity 224 trigger any of the policies for boosting resources. In some examples, if the application 110 is on a whitelist and it is currently active, the policy for boosting is applicable. If a boosting policy is applicable, the resources for the VM 106 are boosted at 206. However, if no boosting policy is applicable, the user activity 220, VM activity 222, and/or application activity 224 is evaluated under unboosting policies at 208. In some examples, if an application is blacklisted, or if a user is idle, an unboosting policy applies. At 214, if the unboosting policy applies, the resources for the VM 106 are boosted at 214. The boosting or unboosting event, in some examples the operation of an application, is monitored at 208 until the event is concluded. Once the event is concluded, the resources allocated to the VM 106 are normalized at 210. Once resources are normalized at 210, or if neither boosting nor unboosting policies apply at 204 or 212, the activity agent 108 continues to monitor user activity 220, VM activity 222, and application activity 224 at 202. The policies are, in some examples, defined or created by an administrator. Policies are, in some examples, dictated by business needs. In other examples, policies are changed by the administrator in response to changes in system resources, business activities, or other constraints. Policies are also established, in some examples, based on a terms of service agreement, a service level agreement (SLA), a quality of service (QoS) agreement, or a contract.

Figure 3:
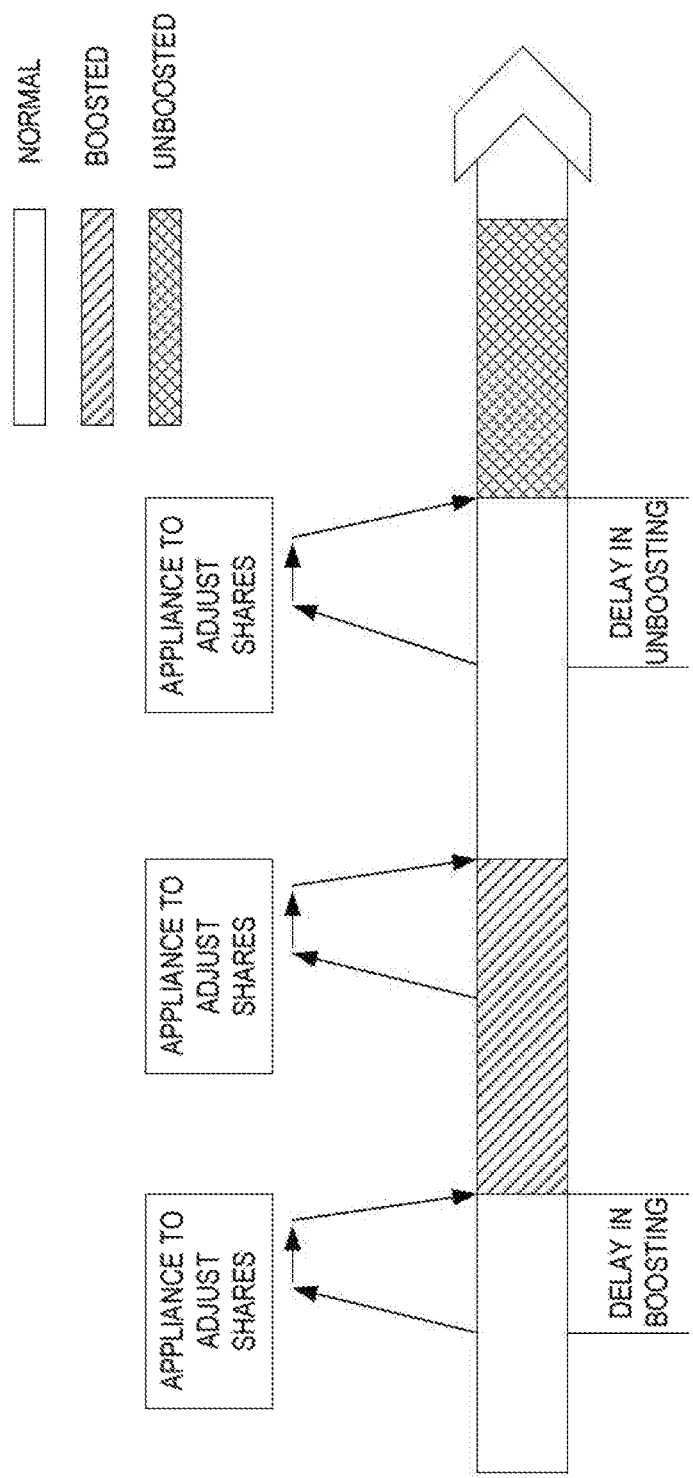
FIG. 3 is an example activity flow diagram of a virtual machine (VM) reservation state.

FIG. 3 illustrates an example activity flow diagram of a VM reservation state. In this activity flow diagram, the VM 106 is initially operating with a normal share of resources. The activity agent 108 reports that the VM 106 is engaged in an activity which allows for a boost in allotted shares. A boost request is initiated by an activity agent 108 based on the activity of the application 110 executing on the VM 106, a user 1508 operating the VM 106, or the activity of the VM 106 itself. The request to boost resources is served through the activity appliance 104 which sits on each host computing device 102, in some examples. The activity appliance 104 arbitrates the incoming requests and executes the request either through a resource allocation manager 100 or directly to a management server 105. In some examples, the requests are executed through VMware Inc.'s vCenter or directly to the ESX host.

There is a delay between the activity agent 108 reporting activity which triggers boosting, unboosting, or normalizing the share allotment of a VM 106, and the execution of the boosting, unboosting, or normalizing of the shares. In some examples, the total delay in executing a boost request includes a network delay from VDI to harness (e.g., automated controller, or appliance VM) of about less than one second, issuing command to the resource allocation manager 100 of about less than one second, the processing of the request which takes 1-2 seconds, and the new updated shares which is approximately one second. As the VM 106 continues to execute, its shares are constantly adjusted as the activity agent 108 reports that the VM 106 should be allocated fewer or more shares based on its activity.

Figure 4:
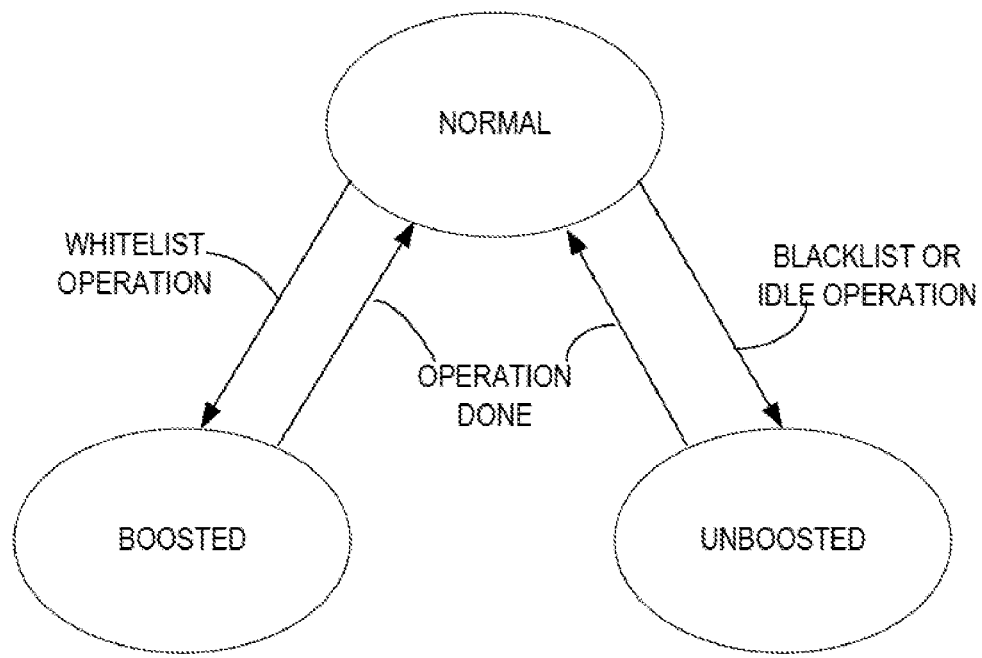
FIG. 4 is an example state diagram indicating how boost and unboots operations are applied to a virtual desktop.

FIG. 4 is an example state diagram indicating how boost and unboots operations are applied to a virtual desktop. Under the disclosed method, when an activity agent 108 detects a whitelist operation executed and active for a period greater than a defined threshold, in some examples 10 seconds, it elevates the resource shares of that VM by ten times the normal allocation. Normal CPU shares are, in some examples, initially set at 1000 shares. In that example, whitelist application 110 usage triggers a CPU boost to 10,000 shares. Similarly when the activity agent 108 detects a blacklist operation, in some examples browsing to non-work related, flash intensive, or graphics intensive websites, or to CPU intensive music streaming or video playing, the allocated shares are reduced to 100. If a virtual desktop is idle for longer than 10 minutes or a session is disconnected, shares are reduced until the user 1508 returns.

As the user moves through various activities, shares may be elevated or temporarily reduced to ensure that maximum priority is given to the highest value activities occurring on the ESX host at any given time. When CPU and I/O resources are plentiful, these background shares adjustments have a modest effect upon active users. However during periods of higher host resource consumption, aspects of the disclosure offer a substantial and ongoing benefit to the more (or most) critical activities, acting as an insurance policy for preserving user experience around the more (or most) critical application activities.

Figure 5:
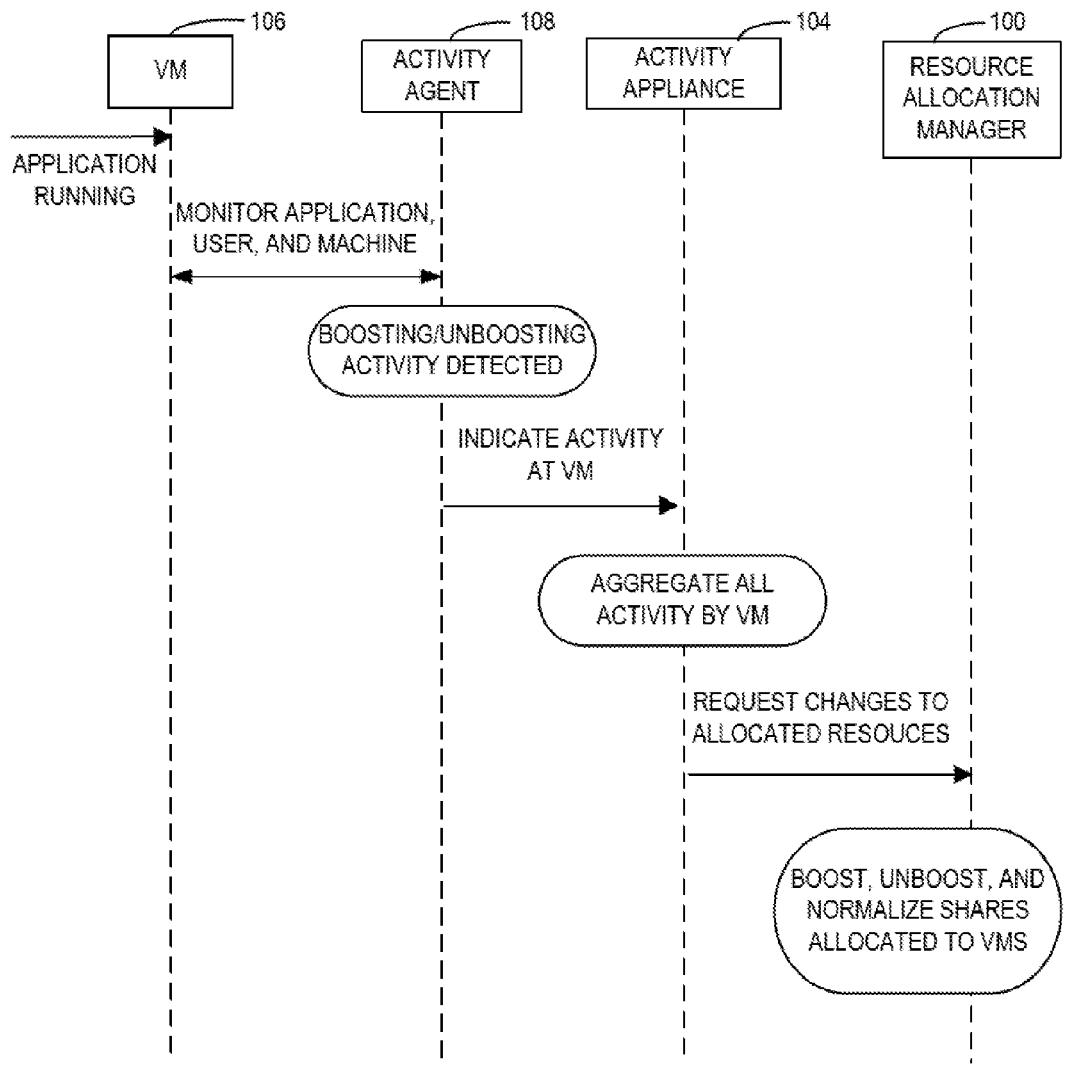
FIG. 5 is an example sequence diagram of a VM, its associated activity agent, the activity appliance for the host computing device where the VM is located, and the resource allocation manager during boosting and unboosting operations.

FIG. 5 is a sequence diagram of a VM 106, its associated activity agent 108, the activity appliance 104 for the host computing device 102 where the VM 106 is located, and the resource allocation manager 100 during boosting, unboosting, and normalizing operations. Although the interaction between a single VM 106, its activity agent 108, activity appliance 104, and the resource allocation manager 100 is illustrated, it is understood that a plurality of VMs 106, with a plurality of associated activity agents 108, operating on a plurality of host computing devices 102 with a plurality of activity appliances 104 are all coordinated by the resource allocation manager 100. Likewise, although only one iteration of monitoring, reporting, and boosting/unboosting/normalizing is illustrated, the sequence may be continuous, intermittent, periodic, repetitive, or the like. As monitored activity changes, the activity agent 108, activity appliance 104, and resource allocation manager 100 continue to respond to the monitored activities.

Initially, a VM 106 is executing applications. The activity agent 108 monitors the activity of the VM 106, the user 1508, and the applications 110. The activity agent 108 identifies any activity which fits into predetermined policies for boosting, unboosting, or normalizing resource allocation. The identified activities are transmitted to the activity appliance 104.

The activity appliance 104 aggregates all of the information from the activity agents 108 on the VMs 106 associated with the host computing device 102 of that activity appliance 104. The activity appliances 104 requests that the resource allocation manager 100 change the shares allocated to VMs 106, and the resource allocation manager 100 responds by making shares adjustments in response to the reported activities.

Figure 6:
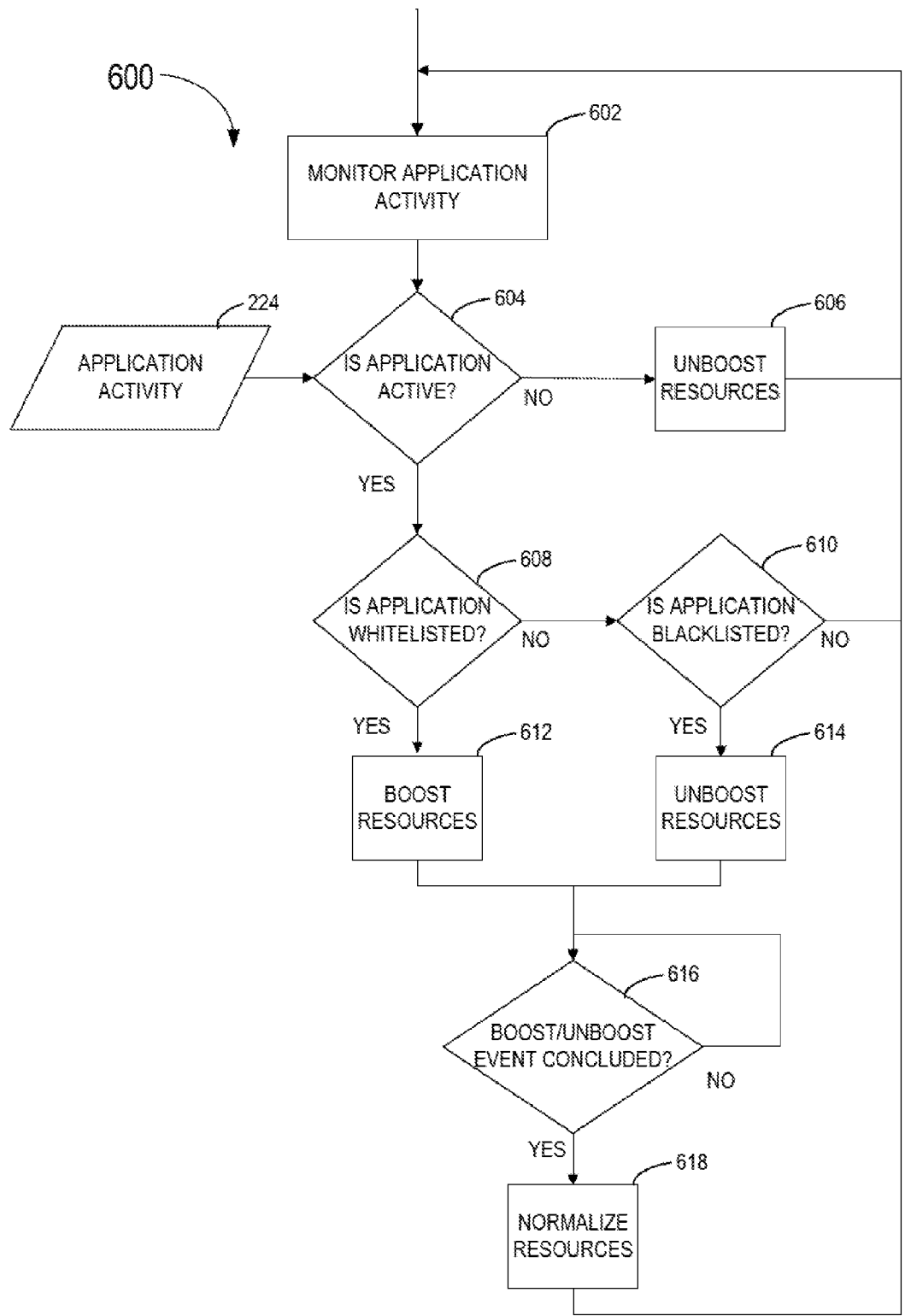
FIG. 6 is a flowchart of an example method of boosting or unboosting VM resources based on detected application activity.

FIG. 6 is a flowchart of an example method of boosting or unboosting VM resources based on detected application activity. At 602, the activity agent 108 monitors the application activity 224 of its assigned VM 106. The activity agent 108 establishes whether the application 110 is active or not at 604. In some examples, such as for an application 110 executing in a WINDOWS brand operating system, an application 110 is considered active if that application 110 is running in a window which is "in focus". In other examples, such as in a LINUX brand operating systems, an application 110 is considered active if it is on top of other applications 110, if the mouse is pointing at the application 110, if the application 110 is receiving other input from a user interface device 1610, or the like.

If the application 110 is determined to be idle at 604, the resources assigned to the associated VM 106 are unboosted at 604. However, if the application 110 is active at 604, the activity agent 108 evaluates whether the application is whitelisted at 608. If the application 110 is whitelisted, the resources of its associated VM 106 are boosted at 612.

At 610, if the application 110 is not determined to be on the whitelist, the activity agent 108 evaluates the application 110 to determine if it is on a blacklist. A blacklist, in some examples, includes applications 110 which an administrator, user, or other policy-maker has indicated are prohibited or entitled to fewer resources than other applications. Streaming of movies, browsing of social media sites, or other activities are, in some examples, examples of activities which could be blacklisted because they are in violation of company policies. If an application is blacklisted at 610, the resources assigned to the associated VM 106 are unboosted at 614.

The activity agent 108 continues to monitor the VM 106 until the application 110 which precipitated the boosting or unboosting of resources has concluded at 616. Once the affected application 110 has terminated, the resources allocated to the VM 106 are normalized at 620. The activity agent 108 continues to monitor application activity at 602 responding to application activity 224 as described above.

Figure 7:
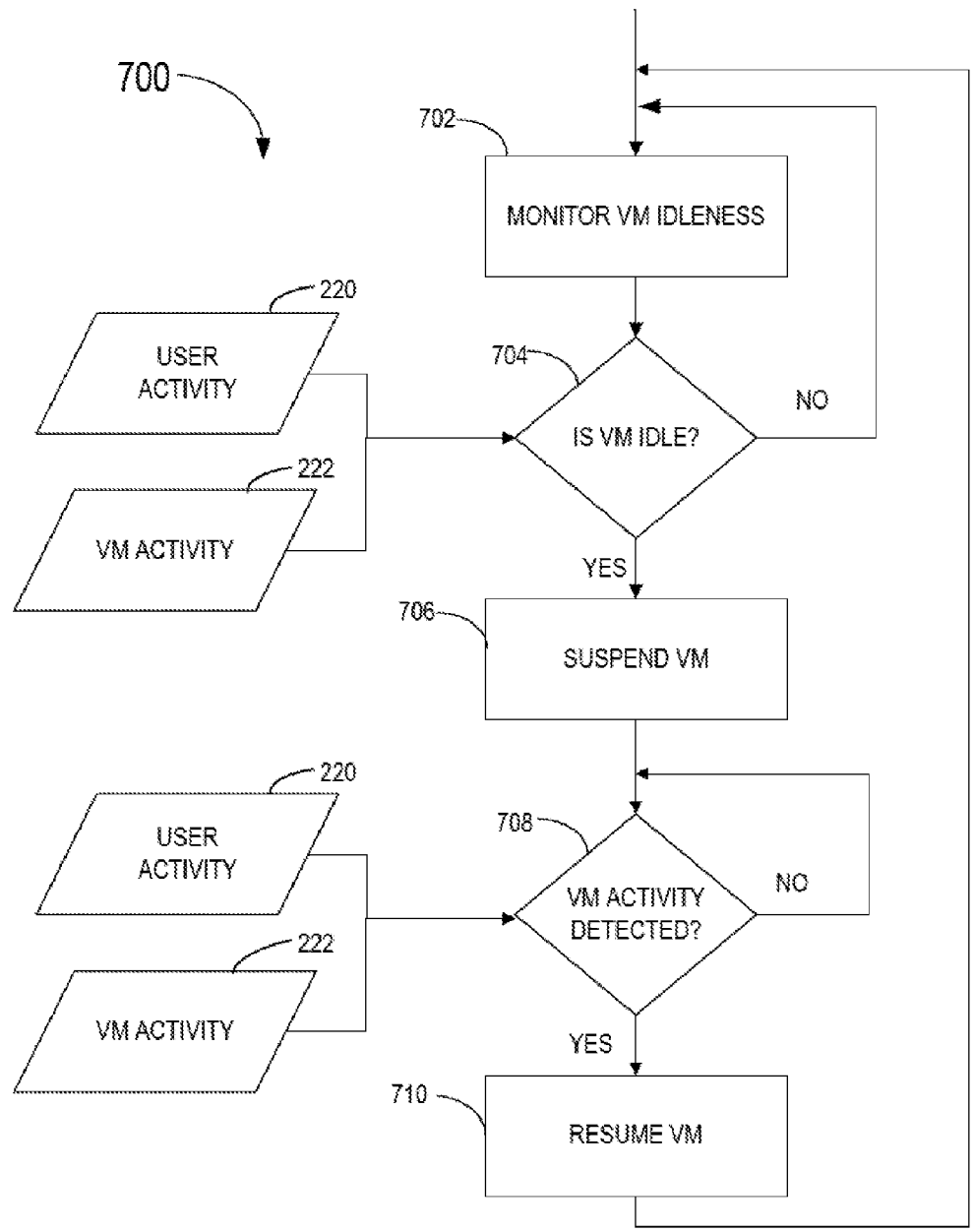
FIG. 7 is a flowchart of an example method of suspending or resuming a VM based on detected VM activity.

FIG. 7 is a flowchart of an example method of suspending or resuming a VM 106 based on the detected VM activity 222. High efficiency suspend and resume designs allow idle virtual desktops to be suspended to save resources. In general, the method acts to free up resources to suspend an idle VM 106, halting its execution and eventually evicting its memory contents to disk so that other active desktops may leverage these shared resources. Aspects of the disclosure determine when it is safe to suspend a VM 106. Even VMs 106 that appear idle from a user 1508 standpoint (e.g., no mouse or keyboard activity) may in fact be running important background tasks that should not be interrupted. The disclosed method assists in determining when VMs 106 that are idle from the user 1508 standpoint may be suspended by waiting until CPU & disk I/O load falls under a designated level for a defined period of time. Upon passing this filter, the VM 106 is assumed safe for suspension. As such, the platform efficiency of this suspend and resume design may be safely harnessed.

Traditionally, suspending a VM requires copying the full memory to disk, which takes valuable processing time. Under the disclosed method, at 702 the activity agent 108 monitors the VM 106 idleness or activity. Suspending the VM when both the user and the machine are idle conserves resources and minimizes the effect on user experience. In some examples, a VM is determined to be idle if the session state meets falls within established policies or guidelines. In one example, a VM is considered idle if its VDI has disconnected. In other examples, if the CPU and/or I/O loads fall below a defined level for a defined period of time. As an example policy, if a user 1508 is idle and less than 5% of allocated CPU resources are utilized for a duration of 10 minutes or more, then the VM 106 is considered idle. Although a user 1508 is idle, the VM 108 is still capable of executing applications or processes in the background which consume resources and indicate that the state of the machine is not idle. In that example, instead of suspending the VM 106, the shares are unboosted. Unboosting the shares when the VM 106 is active but the user 1508 is idle does not degrade the user 1508 experience.

If, at 704, the VM 106 is idle, then the VM 106 is suspended at 706. Suspending the VM 106 permits the resource allocation manager 100 to reallocate the CPU resources assigned to the suspended VM 106 to other VMs 106. The activity agent 106 continues to monitor its associated VM at 708. Upon receipt of any new VM activity 222 the activity agent 106, in some examples, requests that the activity appliance 104 notify the resource allocation manager 100 to re-allocate shares to the suspended VM 106, and the VM 106 resumes at 710. In some examples, the activity agent 106 communicates directly with the resource allocation manager 100 for re-allocation of the shares as the VM 106 is resumed.

Figure 8:
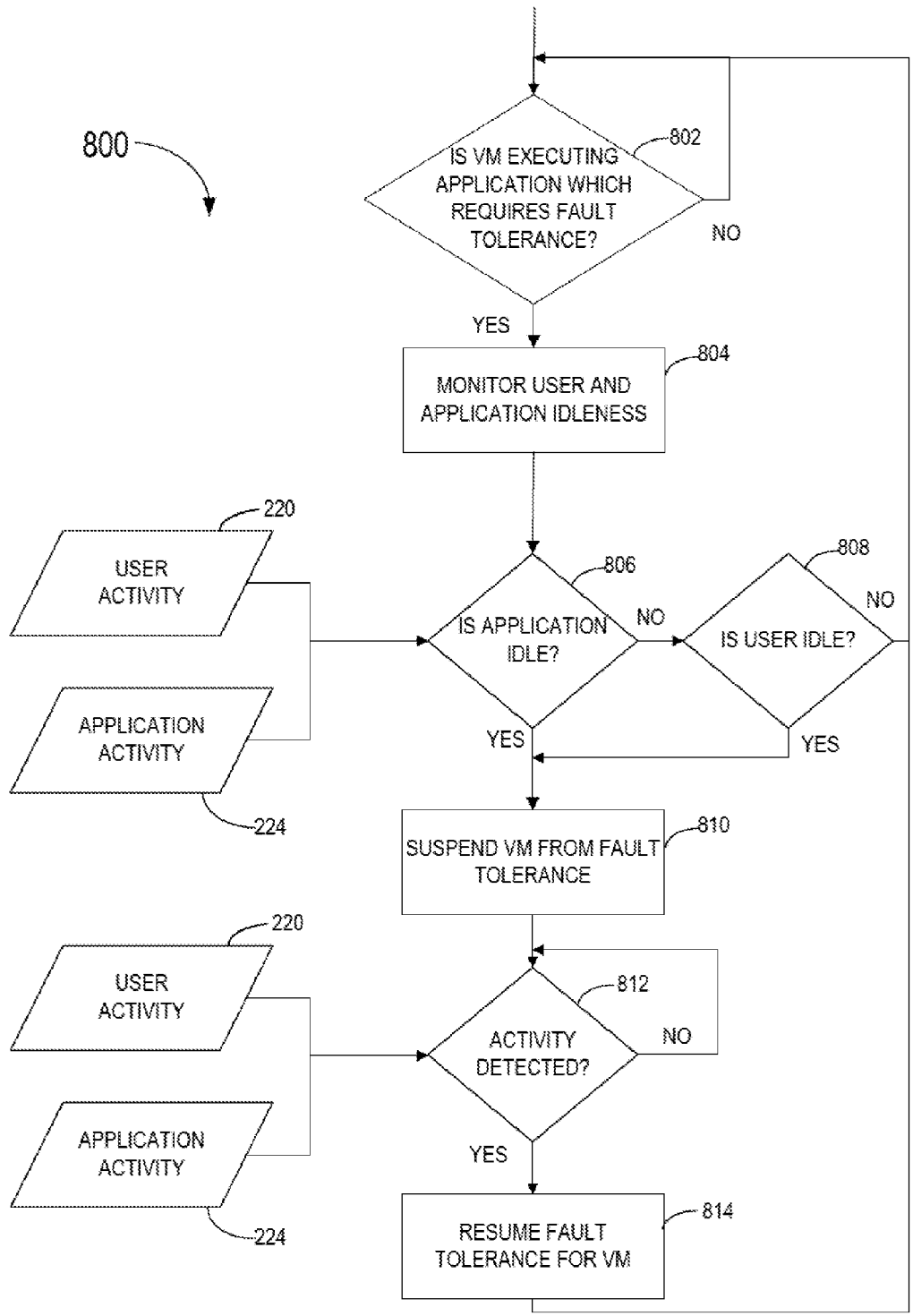
FIG. 8 is a flowchart of an example method of optimizing utilization of fault tolerance for VMs based on user and application activity.

FIG. 8 is a flowchart of an example method of optimizing utilization of fault tolerance for VMs 106 based on user activity 220 and application activity 224. In some examples, fault tolerance is a capability of platforms, such as vSphere by VMware, Inc., that allows VMs 106 to run in lock-step with one another which guarantees uninterrupted service even if the physical host on which the VM 106 is running fails. However, in some examples fault tolerance features require twice the overhead. The overhead costs make fault tolerance expensive in all but niche use cases. Some examples of the disclosed method optimize fault tolerance by calling for a VM 106 to be placed in this mode only when a key high-value application 110 is being used by a user 1508. When the user 1508 stops using the key application 110, then the VM 106 may be removed from fault tolerance mode. If the key application 110 is only in use about 10% of the time by the user 1508 population, then the fault tolerance overhead tracks accordingly with only 10% overhead instead of 100% as is the case by default.

At 802 the activity agent 108 evaluates whether the VM 106 is executing an application 110 which requires fault tolerance. If the application 110 does not require fault tolerance, the activity agent 108 continues to monitor it, but no further action is taken. At 804, if the application 110 requires fault tolerance, the activity agent 108 monitors the user activity 220 and the application activity 224. If the application 110 is idle at 806, then the appliance is removed from fault tolerance at 810. In some examples of removing fault tolerance, the host computing device 102 ceases reporting the activity or state of the VM 106 to any mirror sites for fault-tolerance. In other examples of removing fault tolerance, the host computing device 102, hypervisor 1610, or other controlling logic discontinues the duplication of the state of the VM 106 for fault tolerance.

If the application 110 is not idle at 806, but the user 1508 is idle at 808, then the application 110 is still removed from fault tolerance. However, the activity agent 108 continues to monitor the user activity 220 and application activity 224 at 812. If activity is detected, then fault tolerance synchronization for that VM 106 is resumed at 814. The activity agent 108 continues to monitor the application 110, removing or reinstating fault tolerance as appropriate.

Figure 9:
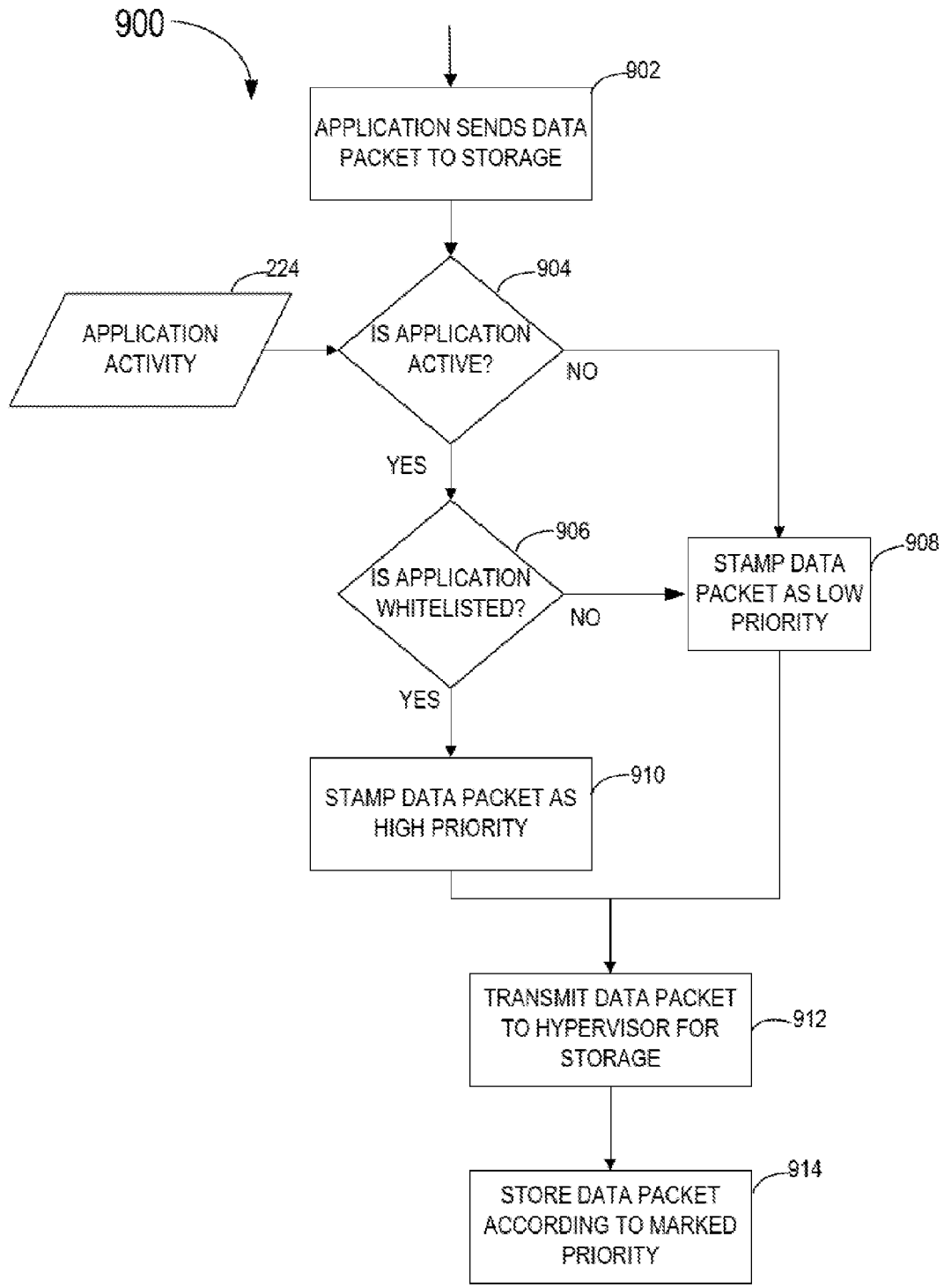
FIG. 9 is a flowchart of an example method of prioritizing storage and input/output (I/O) activity based on application activity of a VM.

FIG. 9 is a flowchart of an example method of prioritizing storage and I/O activity based on application activity 224 of a VM 106. At 902, an application 110 sends or transmits a data packet to storage, or marks the data packet for storage. The data packet, in some examples a small computer systems interface (SCSI) packet, includes a header which may be marked, stamped, or otherwise identified by a filter driver to indicate the priority of the data packet. The stamp, as part of the header, is transmitted across the virtualization layer and is used by the hypervisor 1610 to re-order data packets in the storage queuing system. In some examples, the storage packets are also used by storage array systems to prioritize storage requests. When a management server 105 is under heavy load, the SCSI packets with the highest priority assignments will be processed at the front of the queue allowing for lower latency back to the application in question. Further, when users of a VDI VM 106 are detected to be idle based on keyboard/mouse criteria or up on VDI session disconnection status, the I/O priority stamping resets to a lower value automatically. Using this I/O control, QoS terms for application 110 storage may be met.

The activity agent 108 evaluates whether the application 110 transmitting the data packet is active at 904. If the application 110 does not meet the criteria for active, then the activity agent 108 instructs the filter driver to stamp the data packet header with a low priority code at 908. However, if the application 110 is active then the activity agent 108 evaluates whether the application 110 is whitelisted at 906. If the application 110 is not whitelisted, then the data packet header is, again, stamped with a low priority code at 908.

However, if the application 110 is whitelisted, then the data packet is stamped as high priority at 910. The data packet is then transmitted to the hypervisor 1610 for storage at 912. At 914, the data packets that the hypervisor 1610 receives are processed based on the priority code stamped on the data packet. In some examples, multiple priorities are used. In other examples, the system is binary and only "high" and "low" priority codes are used.

Figure 10:
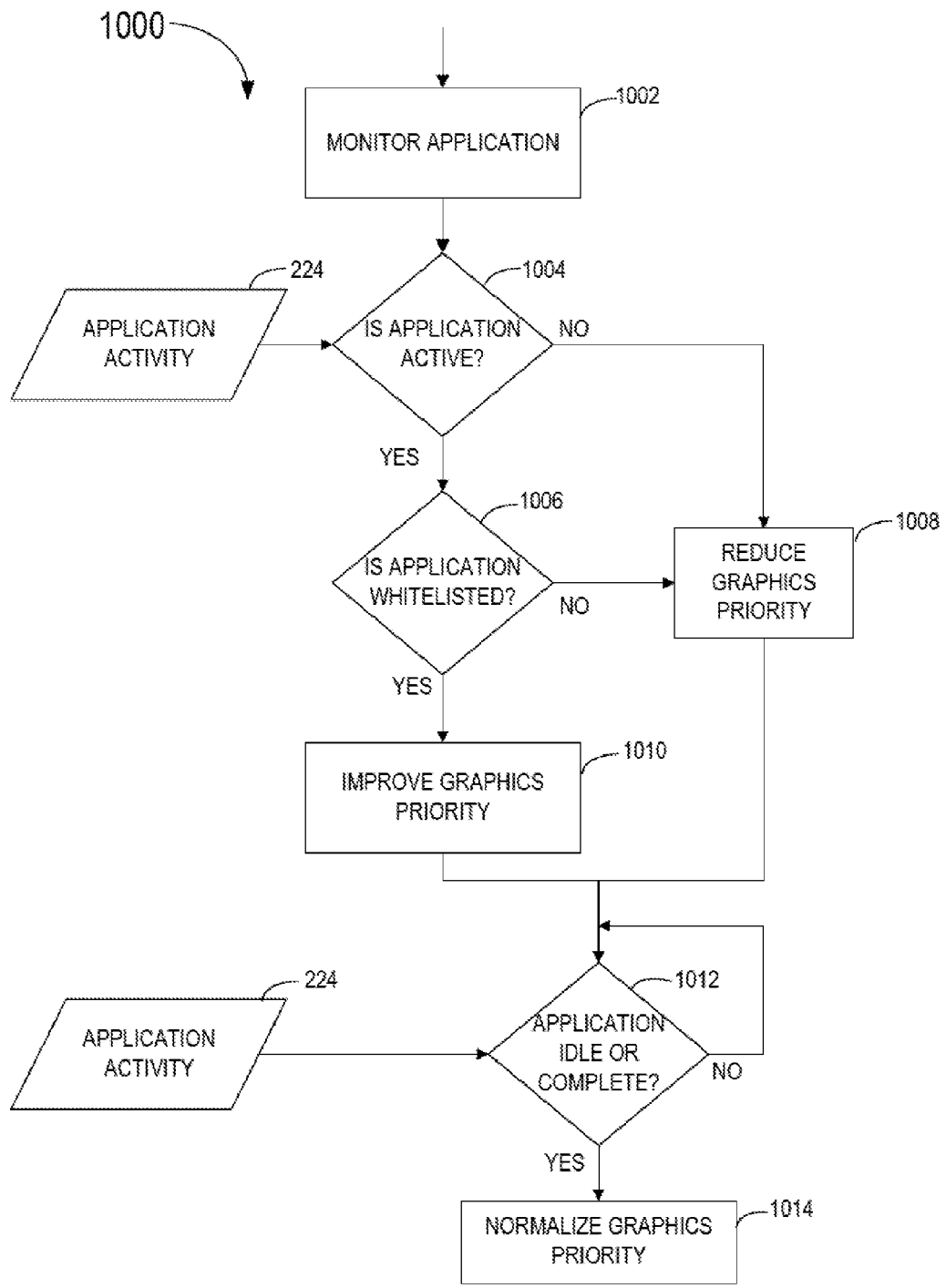
FIG. 10 is a flowchart of an example method of dynamically allocating graphics resources based on application activity of a VM.

FIG. 10 is a flowchart of an example method of dynamically allocating graphics resources based on application activity 224 of a VM 108. Applications may generate very different bandwidth consumption profiles based on the amount of video traffic, the rate of screen changes, the type of underlying operating system, etc. VDI users 1508 accessing their desktops from a branch office location may suffer degradation if a wide area network (WAN) link that connects them to the datacenter becomes saturated. For this reason, the application activities deemed more or most critical should receive priority handling to ensure that WAN resource utilization is aligned with business priorities. Advanced graphics remoting protocols such as PC-over-IP (PCoIP) allow for dynamic changes to parameters such as frame-rate, compression levels etc. By integrating the disclosed method based on QoS agreement or policies with the Display Protocol configuration, the bandwidth consumed based on the application 110 in use is controllable, to some extent. This provides better control over costly shared WAN resources. Users 1508 engaged in high bandwidth activities for non-important activities may be throttled or unboosted to allow business critical applications 110 greater access and priority on the WAN link.

At 1002, the activity agent 108 monitors the application 110. The activity agent 108 evaluates whether the application 110 is active at 1004. If the application 110 is not active, then the graphics priority of the application is reduced at 1008.

If the application 110 is active, then the activity agent 108 compares the application 110 to the whitelist. If the application 110 is whitelisted, then the graphics priority of the application 110 is improved at 1010. Otherwise, if the application is not whitelisted at 1006, then the graphics priority of the application is reduced at 1008.

The activity agent 108 continues to monitor the application activity 224 at 1012. Once the application 110 becomes idle, or is complete, the graphics priority is normalized at 1014. Changing the graphics priority of an application 110 also includes, in some examples, changing the encoding, compression, or framerates of the graphics. More or fewer resources are allocated to the application 110 to perform these operations depending on the graphics priority of the application 110.

Figure 11:
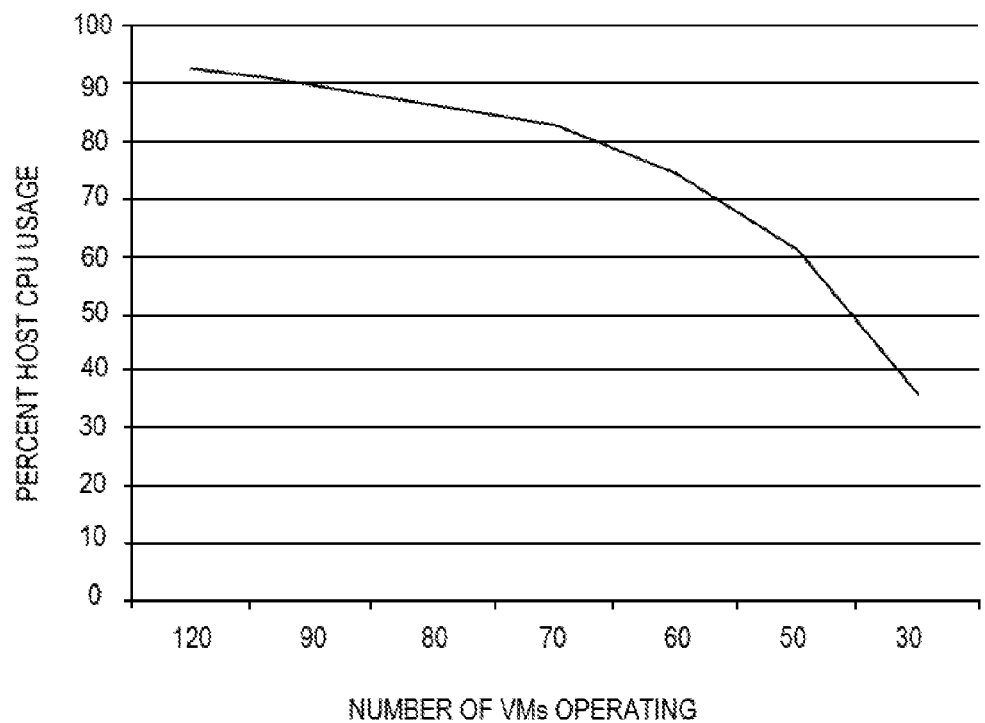
FIG. 11 is an example graphical representation of host computing device processor usage at different test densities of VMs per host computing device.

FIG. 11 is a graphical representation of host computing device 102 example CPU usage at different test densities of VMs 106. The test data represented was acquired using ViewPlanner 3.0 from VMware Inc., which is a test suite designed to simulated the activities of users 1608 across a range of applications 110 at scale. All applications 110 were tested with a 5 second 'think time' representing an estimated delay between task actions within various applications 110. Three iterations were executed on each VM 106. During each iteration, users 1608 performed about 40 minutes of active application 110 time and 25 minutes of idle time broken down as 5 distinct 5 minutes background tasks, such as viewing flash animated websites, large file downloads, or background anti-virus scans. These idle activities represent load inducing activities performed when users 1608 have stepped away from their desktop or disconnected. The load induced by these background activities is considered to be much less urgent or less important than loads produced by active users 1608 on the system. As the number of VMs 106 operating is reduced, the percent of CPU resources utilized also decreases.

Figure 12:
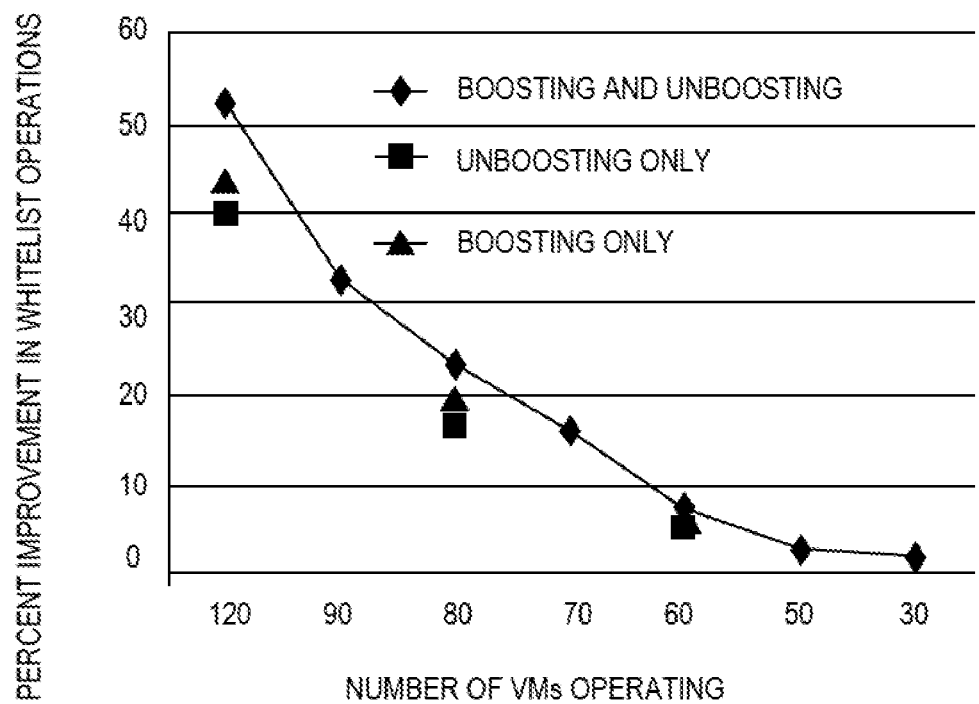
FIG. 12 is an example graphical representations of the percent improvement in normal operations of whitelisted applications at different test densities of VMs during spreadsheet sort-compute operations.
Figure 13:
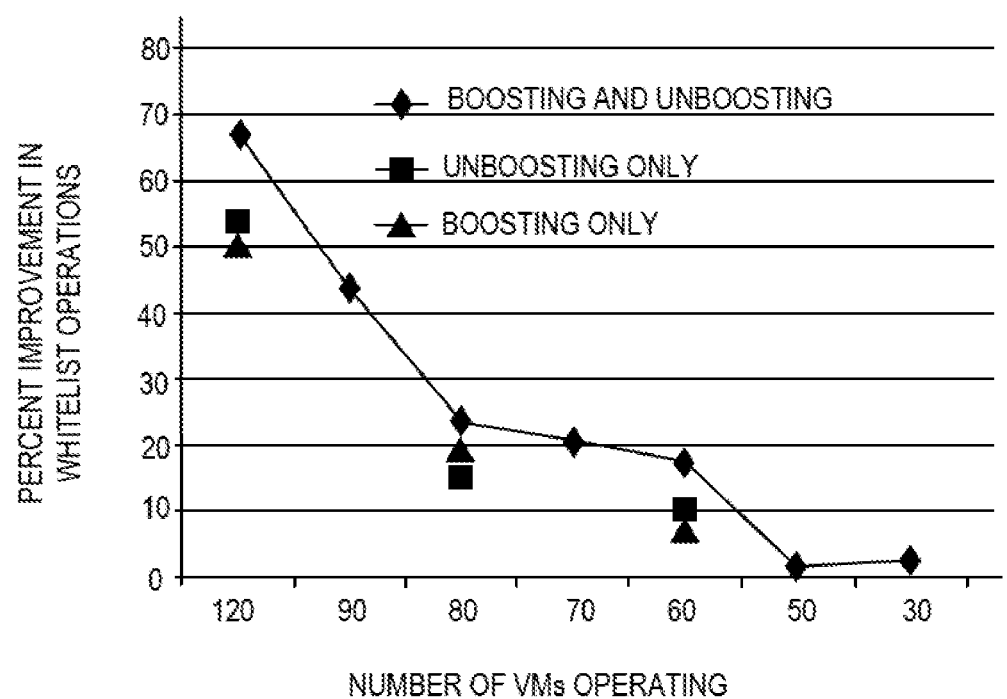
FIG. 13 is an example graphical representation of the percent improvement in normal operations of whitelisted applications at different test densities of VMs during spreadsheet sort-entry operations.
Figure 14:
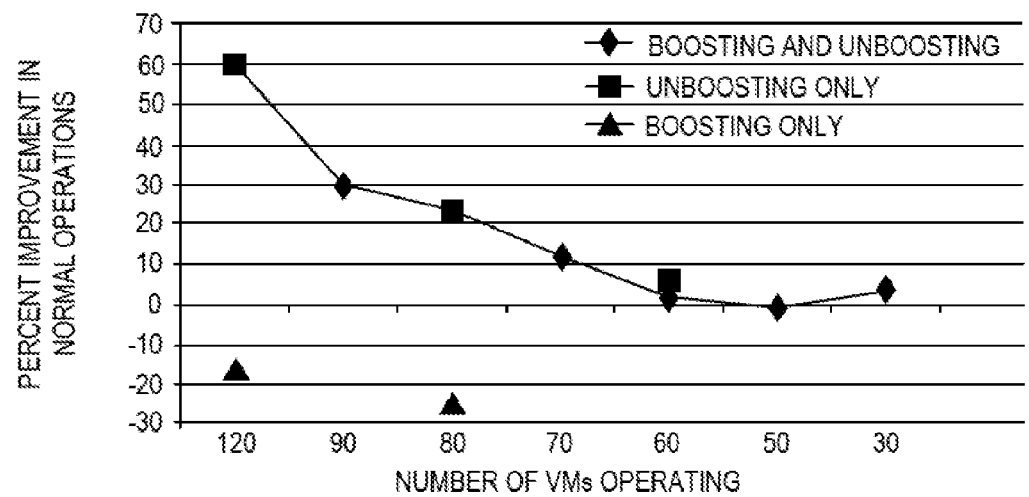
FIG. 14 is an example graphical representation of the percent improvement in normal operations of whitelisted applications at different test densities of VMs during document save operations.

FIGS. 12 through 14 are graphical representations of the example percent improvement in normal operations of applications at different test densities of VMs 106. The disclosed method was tested in four configurations. First, at a baseline or normal allocation of shares. In the first configuration, no changes are made to the shares allocated to a VM 106 and all VMs 106 are treated equally. In the second configuration, both boosting and unboosting of shares is performed based on monitored activity. As user activity 220, VM activity 222, and/or application activity 224 fall within policies or guidelines, the shares allocated to the associated VM 106 are boosted, unboosted or normalized. Under the third example configuration, only boosting of allocated shares was performed, without unboosting. Tests where only boost activity is active apply a resource elevation to whitelisted applications but do not reduce shares for idle or blacklisted VMs. Under the fourth configuration, no boosting was performed, but blacklisted activities were unboosted in accordance with a policy. Tests where only unboots activity is active apply a resource reduction to blacklist applications or idle VMs, but do not boost whitelisted applications. Testing these modes separately demonstrated the individual effect of each configuration on VM 106 operations.

Testing was conducted at different VM 106 densities to establish the relative impact of the disclosed method at various densities from 30 to 120 VMs 106 per host computing device 102. The score of each test run is based on the View Planner score for the specific whitelist application 110. The EXCEL brand spreadsheet, from Microsoft Corporation, sort-entry and sort-compute task activities of ViewPlanner were used for whitelist operations.

FIG. 12 is a graphical representations of an example percent improvement in normal operations of whitelisted applications 110 at different test densities of VMs 106 during sort-compute operations. The disclosed method of boosting and unboosting provides more than 50% improvement over existing methods of share allocation among VMs 106 at high VM 106 densities. FIG. 12 illustrates that at high densities of VMs 106, for example 120 VMs 106 per host computing device 102, the disclosed method of both boosting and unboosting provides a more than 10% improvement over unboosting alone, and roughly 10% improvement over boosting alone. However, all three method provide significant improvement over normal operations.

FIG. 13 is a graphical representations of an example percent improvement in normal operations of whitelisted applications 110 at different test densities of VMs 106 during sort-entry operations. At high densities of VMs 106 per host computing device 102, under the disclosed method of both boosting and unboosting, there is nearly a 70% improvement in whitelist operations over existing methods during the sort-entry operations. With boosting or unboosting alone, roughly a 50% improvement in operations exists.

FIG. 14 is a graphical representations of an example percent improvement in normal operations of whitelisted applications 110 at different test densities of VMs 106 during document save operations. While spreadsheet operations are CPU intensive, document save operations are both CPU and I/O intensive. Although most apparent at high densities of VMs 106 per host computing device 102, a clear pattern emerges showing increasingly dramatic benefits to execution times as the density of VMs 106 goes up. At about 65 VMs 106 per host computing device 102, the management server 100 is running at roughly 80% CPU utilization, and showing approximately 25% boost in execution times across all the operations. At 90% load levels, or 90 VMs, there is an even more dramatic impact with the disclosed method protecting execution by 30 to 45%, with enhanced execution improvements of 60 to 70% at the highest level of CPU pressure.

FIG. 14 also illustrates that the disclosed method assists activities that are primarily I/O bound. The document 'save as' operation within ViewPlanner is an I/O heavy operation. As the density of VMs 106 per host computing device 102 increases, even an I/O heavy operation may benefit dramatically. The application 110 performed in the tests for FIG. 14 is not a whitelist application 110, so the improvements are a results of 'unboosting' the idle VMs 106. Better access to the CPU cycles to complete the I/O task quickly dramatically improve results even for this non-boosted application 110. The disclosed method improves access to CPU resources by critical path activities by unboosting non-critical path activities.

The disclosed method offers a steady-state enhancement for whitelist applications 110 of highest value, but it also provides a form of insurance for anomaly load conditions in which CPU or I/O contention may be higher than normal or higher than expected. During these periods, the disclosed method improves user 1508 experience for those applications 110 that are identified as more important to user 1508 experience, or to the business, in accordance with an established policy.

FIGS. 12 through 14 show several example test cases where in addition to applying the disclosed method, tests were run applying only the boost or only the unboost methods, also. Both of these methods add value individually but better results are obtained by using them together. Applying reduced resource shares to idle or disconnected virtual desktops gives the management server 105 a pool of machines from which it will take cycles when appropriate (e.g., needed) to accommodate the demands of either regular desktops or VMS 106 engaged in whitelist activities. As the management server 105 comes under increasing stress, there are less and less resources to meet demand. In these circumstances, the management server 105 would normally allocate increased wait time to all VMs 106 equally. However, under the disclosed method, the management server 105 is capable of giving more cycles to latency sensitive activities or those in the critical path for key business activities. Idling VMs 106 that may be exerting considerable load due to background activities such as anti-virus tools, websites looping through flash animations, or music players, may be allocated less priority and consequently fewer shares, because they are inherently impacting to users 1608 less and can afford to stretch their activities over a longer time period.

FIG. 15 is a block diagram of an example host computing device 102. Host computing device 102 includes a processor 1502 for executing instructions. In some examples, executable instructions are stored in a memory 1504. Memory 1504 is any device allowing information, such as executable instructions and/or other data, to be stored and retrieved. For example, memory 1504 may include one or more random access memory (RAM) modules, flash memory modules, hard disks, solid state disks, and/or optical disks.

Host computing device 102 may include a user interface device 1510 for receiving data from a user 1508 and/or for presenting data to user 1508. User 1508 may interact indirectly with host computing device 102 via another computing device such as a device running VMware's vCenter Server or other management device. User interface device 1510 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 1510 operates to receive data from user 1508, while another device (e.g., a presentation device) operates to present data to user 1508. In other examples, user interface device 1510 has a single component, such as a touch screen, that functions to both output data to user 1508 and receive data from user 1508. In such examples, user interface device 1510 operates as a presentation device for presenting information to user 1508. In such examples, user interface device 1510 represents any component capable of conveying information to user 1508. For example, user interface device 1510 may include, without limitation, a display device (e.g., a liquid crystal display (LCD), organic light emitting diode (OLED) display, or "electronic ink" display) and/or an audio output device (e.g., a speaker or headphones). In some examples, user interface device 1510 includes an output adapter, such as a video adapter and/or an audio adapter. An output adapter is operatively coupled to processor 1502 and configured to be operatively coupled to an output device, such as a display device or an audio output device.

Host computing device 102 also includes a network communication interface 1512, which enables host computing device 102 to communicate with a remote device (e.g., another computing device) via a communication medium, such as a wired or wireless packet network. For example, host computing device 102 may transmit and/or receive data via network communication interface 1512. User interface device 1510 and/or network communication interface 1512 may be referred to collectively as an input interface and may be configured to receive information from user 1508.

Host computing device 102 further includes a storage interface 1516 that enables host computing device 102 to communicate with one or more data storage devices, which store virtual disk images, software applications, and/or any other data suitable for use with the methods described herein. In example examples, storage interface 1516 couples host computing device 102 to a storage area network (SAN) (e.g., a Fibre Channel network) and/or to a network-attached storage (NAS) system (e.g., via a packet network). The storage interface 1516 may be integrated with network communication interface 1512.

Figure 16:
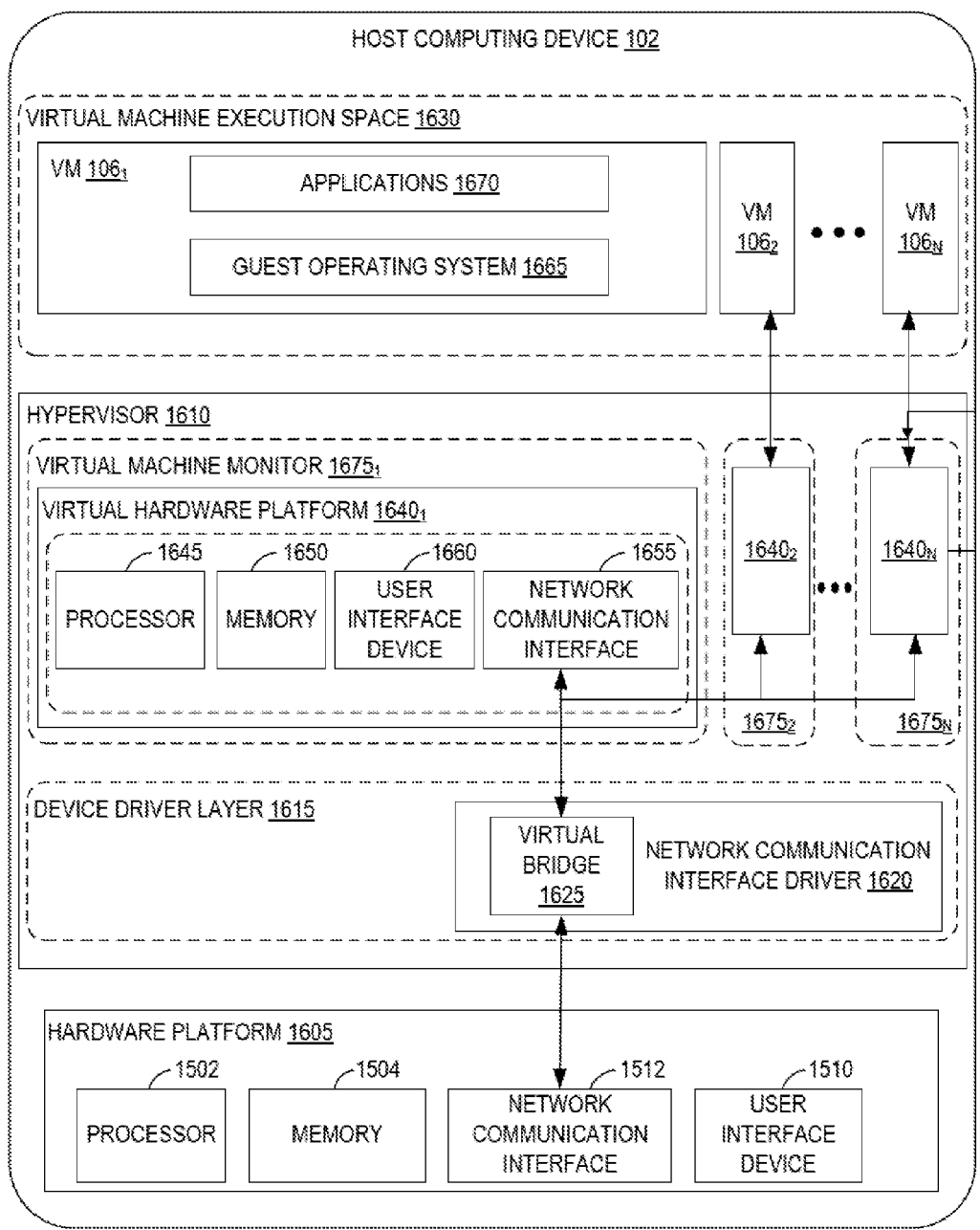
FIG. 16 depicts a block diagram of virtual machines, instantiated on a host computing device, that are scheduled in accordance with the disclosed method.

FIG. 16 depicts a block diagram of virtual machines $106_1$, $106_2 \ldots 106_N$ that are instantiated on host computing device 102. Host computing device 102 includes a hardware platform 1605, such as an x86 architecture platform. Hardware platform 1605 may include processor 1502, memory 1504, network communication interface 1512, user interface device 1510, and other input/output (I/O) devices, such as a presentation device 1506 (shown in FIG. 15). A virtualization software layer, also referred to hereinafter as a hypervisor 1610, is installed on top of hardware platform 1605.

The virtualization software layer supports a virtual machine execution space 1630 within which multiple virtual machines (VMs $106_1$-$106_N$) may be concurrently instantiated and executed. Hypervisor 1610 includes a device driver layer 1615, and maps physical resources of hardware platform 1605 (e.g., processor 1502, memory 1504, network communication interface 1512, and/or user interface device 1510) to "virtual" resources of each of VMs $106_1$-$106_N$ such that each of VMs $106_1$-$106_N$ has its own virtual hardware platform (e.g., a corresponding one of virtual hardware platforms $1640_1$-$1640_N$), each virtual hardware platform having its own emulated hardware (such as a processor 1645, a memory 1650, a network communication interface 1655, a user interface device 1660 and other emulated I/O devices in VM $106_1$). Hypervisor 1610 may manage (e.g., monitor, initiate, and/or terminate) execution of VMs $106_1$-$106_N$ according to policies associated with hypervisor 1610, such as a policy specifying that VMs $106_1$-$106_N$ are to be automatically restarted upon unexpected termination and/or upon initialization of hypervisor 1610. In addition, or alternatively, hypervisor 1610 may manage execution VMs $106_1$-$106_N$ based on requests received from a device other than host computing device 102. For example, hypervisor 1610 may receive an execution instruction specifying the initiation of execution of first VM $106_1$ from a management device via network communication interface 1512 and execute the execution instruction to initiate execution of first VM $106_1$.

In some examples, memory 1650 in first virtual hardware platform $1640_1$ includes a virtual disk that is associated with or "mapped to" one or more virtual disk images stored on a disk (e.g., a hard disk or solid state disk) of host computing device 102. The virtual disk image represents a file system (e.g., a hierarchy of directories and files) used by first VM $106_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 1615 includes, for example, a communication interface driver 1620 that interacts with network communication interface 1512 to receive and transmit data from, for example, a local area network (LAN) connected to host computing device 102. Communication interface driver 1620 also includes a virtual bridge 1625 that simulates the broadcasting of data packets in a physical network received from one communication interface (e.g., network communication interface 1512) to other communication interfaces (e.g., the virtual communication interfaces of VMs $106_1$-$106_N$). Each virtual communication interface for each VM $106_1$-$106_N$, such as network communication interface 1655 for first VM $106_1$, may be assigned a unique virtual Media Access Control (MAC) address that enables virtual bridge 1625 to simulate the forwarding of incoming data packets from network communication interface 1512. In an example, network communication interface 1512 is an Ethernet adapter that is configured in "promiscuous mode" such that all Ethernet packets that it receives (rather than just Ethernet packets addressed to its own physical MAC address) are passed to virtual bridge 1625, which, in turn, is able to further forward the Ethernet packets to VMs $106_1$-$106_N$. This configuration enables an Ethernet packet that has a virtual MAC address as its destination address to properly reach the VM in host computing device 102 with a virtual communication interface that corresponds to such virtual MAC address.

Virtual hardware platform $1640_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1665 in order to execute applications 1670 for an instantiated VM, such as first VM $106_1$. Virtual hardware platforms $1640_1$-$1640_N$ may be considered to be part of virtual machine monitors (VMM) $1675_1$-$1675_N$ that implement virtual system support to coordinate operations between hypervisor 1610 and corresponding VMs $106_1$-$106_N$. Those with ordinary skill in the art will recognize that the various terms, layers, and categorizations used to describe the virtualization components in FIG. 16 may be referred to differently without departing from their functionality or the spirit or scope of the disclosure. For example, virtual hardware platforms $1640_1$-$1640_N$ may also be considered to be separate from VMMs $1675_1$-$1675_N$, and VMMs $1675_1$-$1675_N$ may be considered to be separate from hypervisor 1610. One example of hypervisor 1610 that may be used in an example of the disclosure is included as a component in VMware's ESX brand software, which is commercially available from VMware, Inc.

Additional Examples

Some examples of the disclosed method include a system for federation of policy for QoS agreements, TOS agreements, and/or user-defined policies for VDI desktops. Under this example, any established policy, such as a QoS policy, for a set of virtual desktops may be communicated or federated from a central console to a resource allocation manager 100 which in turn federates the policy to the set of activity appliances 104 resident on the cluster of host computing devices 102 for the purpose of defining the QoS behaviors on a set of virtual desktops operating on virtual machines 106. In some examples, a federated policy includes which applications 110 are on the whitelist, which are on the blacklist, what constitutes user activity 220, VM activity 222, and application activity 224, what increase or reduction in shares constitutes boosting and unboosting, which graphics settings are tunable, etc.

Other examples of the disclosed method include monitoring systems which monitor performance of applications 110 (e.g., application launch time). This monitored performance information is aggregated into a monitoring solution such as a product, appliance, application, or the like, and may be used as a feedback loop for "external monitoring systems" such as the vROPS product by VMware, Inc. This external monitoring system may suggest and implement adaptations to the federated policy to maximize performance. This example includes a system for monitoring application 110 performance that generates dynamic adjustments to the federated policy. Key performance metrics are fed into a performance monitoring framework which, in some examples, triggers upon abnormal low levels, generating a signals which allows the external monitoring system to elevate or boost the resources associated with the underperforming applications 110. This dynamic feedback helps to ensure that application performance is elevated until a desired level of user 1508 experience is reached even under high levels of hypervisor 1610 utilization.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for value based resource scheduling of virtual desktop interfaces. For example, the operations illustrated in FIGS. 2 and 5-10, when executed by devices such as illustrated in FIG. 1, constitute exemplary means for dynamically allocating physical computing resources of at least one physical computing system amongst a plurality of VMs, including exemplary means for monitoring activity of the user, the VM, and the applications executed by the VM, exemplary means for comparing the collected information to a policy, and exemplary means for determining, based on the comparison, that one or more of the monitored activities has a higher or lower priority than the other activities, and exemplary means for automatically modifying, based on the policy and in response to the determination, an allocation of physical computing resources of the at least one physical computing system to the plurality of VMs. In some examples, reallocation occurs automatically when a machine goes idle, when an application terminates, when a user goes idle, etc. In some examples, idleness is defined as a period of inactivity of 15 minutes. In other examples, an idle period is defined by a user. Policies created by an administrator and federated amongst the elements of the system are updated to include other automatic reallocation events, as defined by the administrator.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for resource allocation in a virtualized computing environment, comprising at least one physical computing system hosting a plurality of virtual machines (VMs), the system comprising:
   a memory;
   a processor;
   a plurality of agents, each associated with at least one of the plurality of VMs, that, when executed by the processor, collect activity information about the associated VM;
   a module that is stored in the memory and, when executed by the processor, dynamically allocates physical computing resources of the at least one physical computing system amongst the plurality of VMs, each of the plurality of VMs configured to execute a virtual desktop remotely accessible by a user, the dynamic allocation performed by:

monitoring, by the plurality of agents, a state of the virtual desktop of each associated VM to detect activities forming at least a portion of the activity information;

comparing the collected activity information to a policy;

in response to the comparing, automatically modifying, based on the activity information, an allocation of the physical computing resources of the at least one physical computing system to each of the plurality of VMs, wherein modifying the allocation of the physical resources for each of the plurality of VMs comprises:

unboosting a number of resources for a VM when one or more of the following activities is detected: a user is idle, the VM is inactive, an application being executed on the VM is a low priority application, and the application is inactive; and boosting the number of resources for the VM when one or more of the following activities is detected: the VM is active, and the application being executed on the VM is a high priority application.

2. The system of claim 1, wherein the VM is allocated a number of shares of the resources, and wherein unboosting the number of resources for the VM comprises reducing the number of shares of the resources.

3. The system of claim 2, wherein the number of shares of the resources to be reduced is based on one or more of the following: a length of time the user is idle, a length of time the VM is inactive, and a length of time the application is inactive.

4. The system of claim 1, wherein the VM is allocated a number of shares of the resources, and wherein boosting the number of resources for the VM comprises increasing the number of shares of the resources.

5. The system of claim 4, wherein the number of shares of the resources to be increased is based on one or more of the following: a length of time the VM is active, and a length of time the high priority application is active.

6. The system of claim 5, wherein the number of shares of the resources increases in proportion to the length of time the VM is active or the length of time the high priority application is active.

7. The system of claim 1, wherein the user is idle if no mouse or keyboard activity is detected for a defined period of time.

8. A method for resource allocation in a virtualized computing environment comprising at least one physical computing system hosting a plurality of VMs, the method comprising:

dynamically allocating physical computing resources of the at least one physical computing system amongst the plurality of VMs, each of the plurality of VMs configured to execute a virtual desktop that is remotely accessible by a user, the dynamic allocation including:

receiving reports of detected activities of: the user, a VM of the user, and applications executed by the VM of the user;

comparing the detected activities to a policy;

in response to the comparing, automatically modifying, based on the policy, an allocation of the physical computing resources of the at least one physical computing system to the plurality of VMs, wherein modifying the allocation of the physical computing resources further comprises:

unboosting a number of resources for a VM when one or more of the following activities is detected: a user is idle, the VM is inactive, an application being executed on the VM is a low priority application, and the application is inactive; and boosting the number of resources for the VM when one or more of the following activities is detected: the VM is active, and the application being executed on the VM is a high priority application.

9. The method of claim 8, wherein the VM is allocated a number of shares of the resources, and wherein unboosting the number of resources for the VM comprises reducing the number of shares of the resources.

10. The method of claim 9, wherein the number of shares of the resources to be reduced is based on one or more of the following: a length of time the user is idle, a length of time the VM is inactive, and a length of time the application is inactive.

11. The method of claim 8, wherein the VM is allocated a number of shares of the resources, and wherein boosting the number of resources for the VM comprises increasing the number of shares of the resources.

12. The method of claim 11, wherein the number of shares of the resources to be increased is based on one or more of the following: a length of time the VM is active, and a length of time the high priority application is active.

13. The method of claim 12, wherein the number of shares of the resources increases in proportion to the length of time the VM is active or the length of time the high priority application is active.

14. The method of claim 8, in response to the comparing:

marking any data packets originated by the high priority application as high priority;

marking any data packets originated by the inactive application as low priority; and marking any data packets originated by the low priority application as low priority.

15. A non-transitory computer-readable medium including computer-executable instructions that, when executed by a processor, allocate resources in a virtualized computing environment comprising at least one physical computing system hosting a plurality of VMs, the computer-executable instructions comprising:

dynamically allocating physical computing resources of the at least one physical computing system amongst the plurality of VMs, each of the plurality of VMs configured to execute a virtual desktop that is remotely accessible by a user, the dynamic allocation including:

receiving reports of detected activities of: the user, a VM of the user, and applications executed by the VM of the user;

comparing the detected activities to a policy;

in response to the comparing, automatically modifying, based on the policy, an allocation of the physical computing resources of the at least one physical computing system to the plurality of VMs, wherein modifying the allocation of the physical computing resources further comprises:

unboosting a number of resources for a VM when one or more of the following activities is detected: a user is idle, the VM is inactive, an application being executed on the VM is a low priority application, and the application is inactive; and boosting the number of resources for the VM when one or more of the following activities is detected: the VM is active, and the application being executed on the VM is a high priority application.

16. The non-transitory computer-readable medium of claim 15, wherein the VM is allocated a number of shares of the resources, and wherein unboosting the number of resources for the VM comprises reducing the number of shares of the resources.

17. The non-transitory computer-readable medium of claim 16, wherein the number of shares of the resources to be reduced is based on one or more of the following: a length of time the user is idle, a length of time the VM is inactive, and a length of time the application is inactive.

18. The non-transitory computer-readable medium of claim 15, wherein the VM is allocated a number of shares of the resources, and wherein boosting the number of resources for the VM comprises increasing the number of shares of the resources.

19. The non-transitory computer-readable medium of claim 18, wherein the number of shares of the resources to be increased is based on one or more of the following: a length of time the VM is active, and a length of time the high priority application is active.

20. The non-transitory computer-readable medium of claim 19, wherein the number of shares of the resources increases in proportion to the length of time the VM is active or the length of time the high priority application is active.

\* \* \* \* \*